L. J. GRAFFORT & P. L. HOFFMAN.
ICE CREAM DISHER.
APPLICATION FILED FEB. 5, 1908.
903,563.  Patented Nov. 10, 1908.
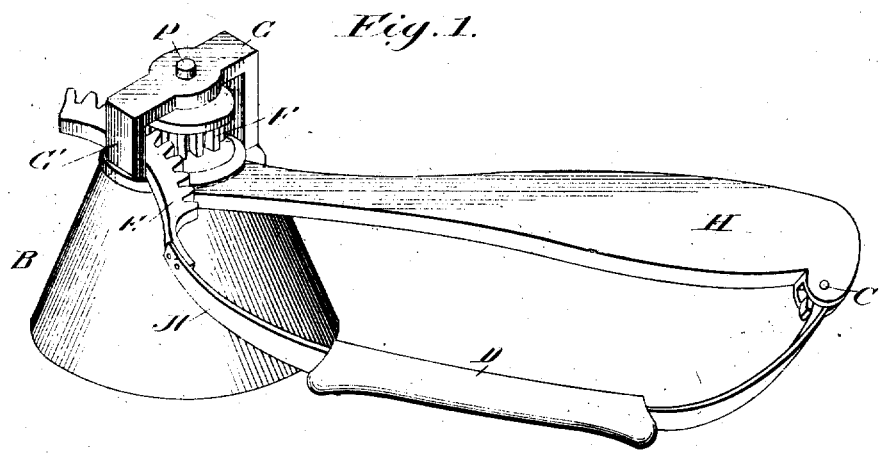
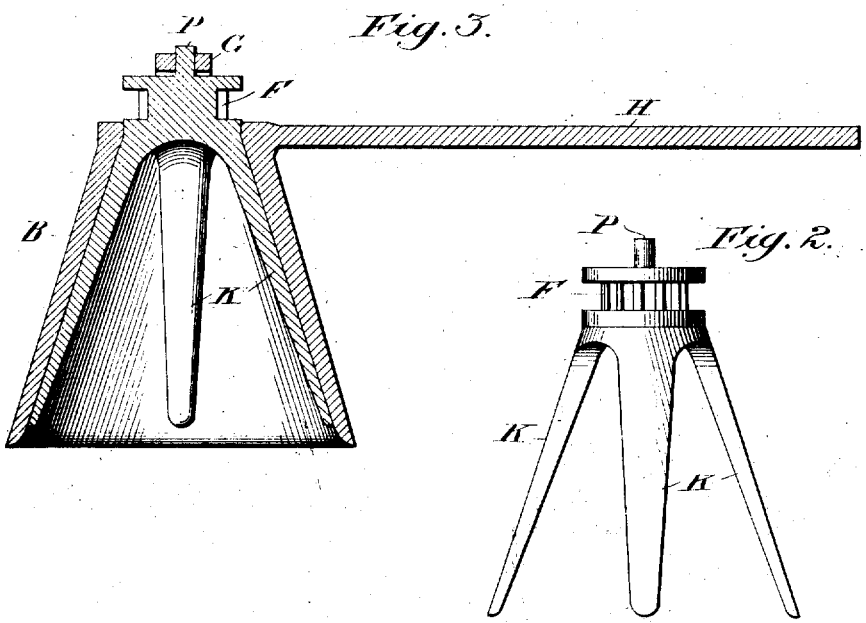

UNITED STATES PATENT OFFICE.

LORY J. GRAFFORT AND PETER L. HOFFMAN, OF NEW CARLISLE, INDIANA.

ICE-CREAM DISHER.

No. 903,563.     Specification of Letters Patent.     Patented Nov. 10, 1908.

Application filed February 5, 1908. Serial No. 414,436.

*To all whom it may concern:*

Be it known that we, LORY J. GRAFFORT and PETER L. HOFFMAN, citizens of the United States, residing at New Carlisle, in the county of St. Joseph and State of Indiana, have invented certain new and useful Improvements in Ice-Cream Dishers, of which the following is a specification.

This invention relates to improvements in ice cream dishers and has for its object such simplification of parts as will facilitate their disassembling and cleansing and will produce an apparatus that shall be reliable, simple and durable.

It consists of the novel construction and combination of parts as are hereinafter described and illustrated in the accompanying drawings in which like parts are referred to by the same reference character.

In the drawings Figure 1 is a perspective view of the parts assembled. Fig. 2 is a side view of the discharging fingers, the pinion and its gudgeon. Fig. 3 is a longitudinal vertical section of the dipper taken through the handle.

The bowl B and handle H are constructed of a single piece of metal and passing across the top of the bowl is a bridge piece G which is perforated to form a bearing for the gudgeon P of the pinion F. This pinion is secured to a circular shoulder from which the discharging fingers K radiate in such a manner as to contact with the interior of the bowl B thus forming a second bearing for the discharger.

Passing beneath bridge piece G and with its teeth engaging the teeth of the pinion is a curved rack E, the bridge piece forming a guide for the rack and serving to hold it in engagement with the pinion. To the inner end of the rack is secured a bow-spring A, the other end of which is pivoted to a set of ears C projecting from one side of the end of the handle H. A sheath D formed for convenience in grasping may be secured to the middle part of the spring A, but this is not essential.

The action of the device is as follows: Assuming the parts to be in position as shown in Fig. 1, the hand grasps the spring and handle and compresses them. This flattens spring A and elongates it thus thrusting rack E through under bridge piece G and rotates the pinion F and the attached discharging fingers K within the bowl B, thus forcing the cream from the bowl. Upon relaxing the pressure of the hand, the resiliency of spring A will draw rack E backward and cause a rotation of the fingers in a reverse direction. By bringing spring A away from the handle rack E will be drawn out from under bridge piece G and from engagement with pinion F, and the discharging fingers and their pinion will be free to fall out through the bowl. The parts will thus be apart for the purpose of cleansing. To reassemble these parts is equally simple. The bowl being inverted the finger piece is dropped into the bowl so that gudgeon P enters its bearing in the bridge piece G. Spring A is retracted sufficiently to allow the end of rack E to pass under G and enter its teeth into engagement with pinion F. As this pinion is provided on its upper surface with a projecting flange, it cannot be removed so long as rack E is in position beneath it.

Having thus described our invention what we claim is:

1. An ice cream disher comprising a bowl provided with a handle, a set of rotating fingers provided with a pinion, a bridge piece secured to said bowl, said pinion being provided with a projecting axis mounted in said bridge piece, and a bowed spring secured to said handle and having one end projected beneath said bridge piece and provided with a rack for engaging said pinion.

2. In an ice cream disher, an open ended bowl with a handle, a bridge piece spanning the open end, rotating fingers secured to a pinion and having one bearing in said bridge piece, a rack guided by said bridge piece and thereby held in mesh with the pinion, and a bow-spring secured at one end to said rack and pivoted at the other end to said handle.

In testimony whereof we affix our signatures in presence of two witnesses.

LORY J. GRAFFORT.
PETER L. HOFFMAN.

Witnesses:
GROVER UHL,
JOHN HUNSER.